R. L. RICKMAN.

METER.

APPLICATION FILED OCT. 27, 1910.

Reissued Dec. 20, 1910.

2 SHEETS—SHEET 1.

13,184.

WITNESSES

Norris Peruge

Paul A. Wolff

INVENTOR

R. L. Rickman

BY

Duell, Warfield & Duell

ATTORNEYS

THE NORRIS PETERS CO., WASHINGTON, D. C.

R. L. RICKMAN.

METER.

APPLICATION FILED OCT. 27, 1910.

Reissued Dec. 20, 1910.

2 SHEETS—SHEET 2.

13,184.

WITNESSES

Norris Pryce

Bulawoff

R. L. Rickman INVENTOR

BY

Duell, Warfield & Duell

ATTORNEYS

THE NORRIS PETERS CO., WASHINGTON, D. C.

UNITED STATES PATENT OFFICE.

ROBERT LEE RICKMAN, OF VANCOUVER, BRITISH COLUMBIA, CANADA, ASSIGNOR OF ONE-HALF TO SAMUEL KENRICK CHAMPION, OF VANCOUVER, BRITISH COLUMBIA, CANADA.

METER.

13,184. Specification of Reissued Letters Patent. Reissued Dec. 20, 1910.

Original No. 964,695, dated July 19, 1910, Serial No. 469,830. Application for reissue filed October 27, 1910. Serial No. 589,623.

*To all whom it may concern:*

Be it known that I, ROBERT L. RICKMAN, a citizen of the United States, residing at Vancouver, British Columbia, Canada, have invented certain new and useful Improvements in Meters, of which the following is a full, clear, and exact description, such as will enable others skilled in the art to which it appertains to make and use the same.

This invention relates to meters, and more especially to those intended for electrical use.

One of the objects thereof is to provide a simple and practical device of this character in which the registering mechanism will register the cost of the electricity which has been consumed.

Another object is to provide a device of this character in which the relative movement of the registering mechanism with respect to the motor mechanism may be varied in order that the meter may be adapted for use under varying conditions of charge per unit.

Another object is to provide a device of this character which will be simple and durable in its construction and which may be easily and quickly adjusted.

A further object is to provide a device of the above general nature which can be applied to the ordinary meters now on the market at a small expense.

Other objects will be in part obvious and in part pointed out hereinafter.

The invention accordingly consists in the features of construction, combinations of elements and arrangement of parts which will be exemplified in the construction hereinafter set forth, and the scope of the application of which will be indicated in the following claims.

Figure 1:
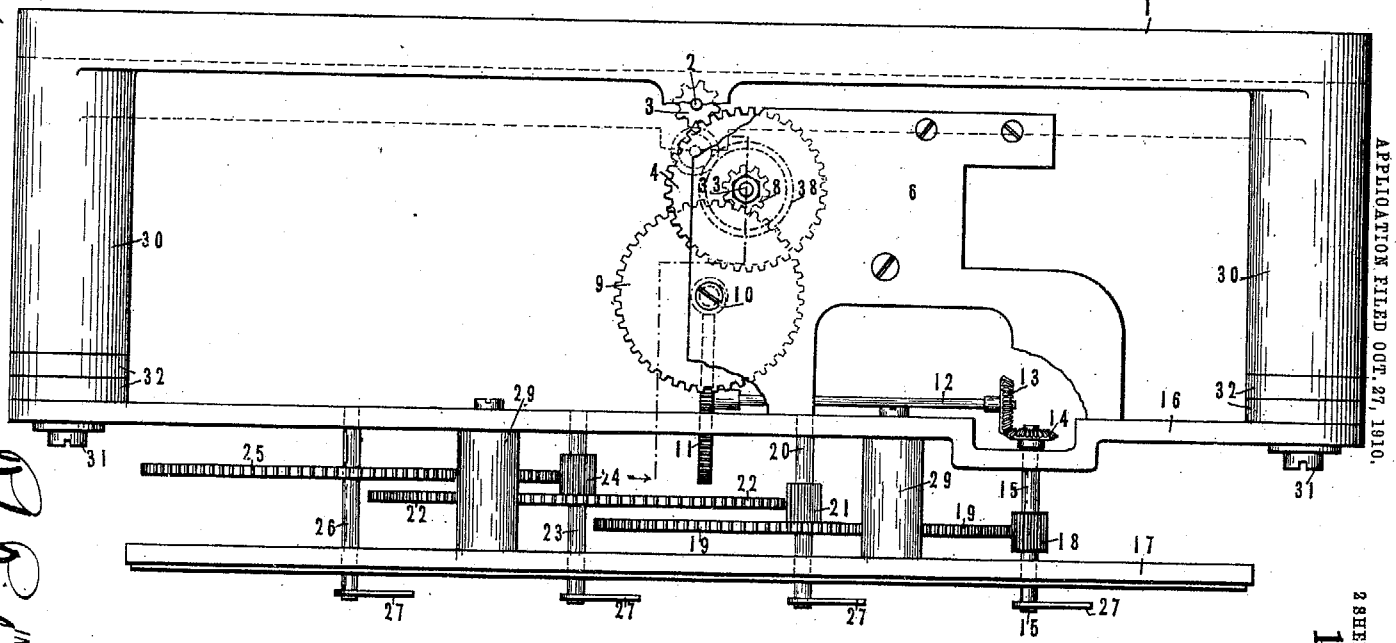
Figure 2:
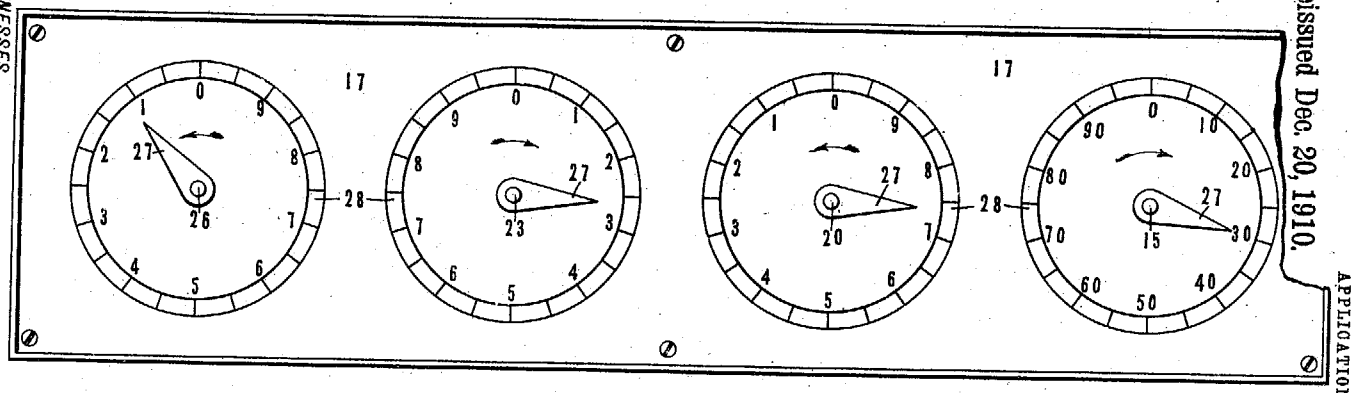
Figure 3:
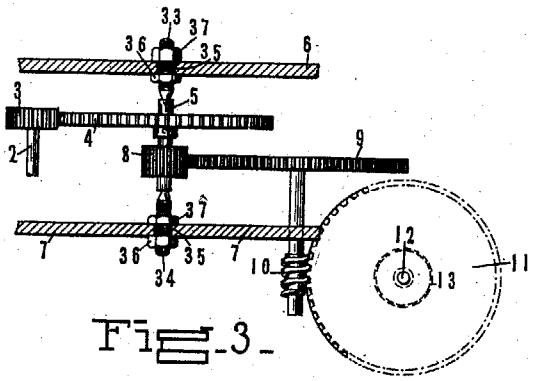

Referring to the drawings which show one of various possible embodiments of this invention, Figure 1 is a top plan view of a meter with its casing removed, parts being broken away for the sake of clearness; Fig. 2 is a front elevation of the dial plate; and Fig. 3 is a sectional view taken on the line *x—x* of Fig. 1.

Similar reference characters refer to similar parts throughout the several views of the drawings.

Before describing this improvement, it may be noted that in electric meters in general use the registering mechanism indicates the amount of electricity consumed, and to the inexperienced person it is a matter of some difficulty to figure out the amount of the bill. One of the purposes of my invention is to obviate this difficulty by so constructing the various parts of the meter that the registering mechanism will indicate directly the exact value in dollars and cents of the current which has been consumed.

Referring now to the drawings, 1 indicates the back or base of the meter, and 2 indicates the rotatable shaft which is driven in the usual manner by the current which passes through the meter, and as this part of the apparatus is old and well known and forms in itself no part of the present invention, it is not deemed necessary to illustrate it. Secured to the shaft in any suitable manner is a pinion 3 which meshes with a gear 4 secured to the arbor 5 which is removably mounted between the upper and lower plates 6 and 7 in a manner hereinafter described. A pinion 8 fixed upon the arbor of said gear meshes with a gear 9 which is also mounted between said plates, and the arbor of which is provided with a worm 10 meshing with the worm wheel 11 secured to one end of the shaft 12. To the other end of said shaft is secured a bevel gear 13 which meshes with the bevel gear 14 secured to the arbor 15 which is rotatably supported between the front plate 16 and the dial plate 17 as clearly shown in Fig. 1. This arbor 15 carries a pinion 18 which meshes with a gear 19 upon the arbor 20, which in turn carries a pinion 21 meshing with a gear 22 upon the arbor 23, and the pinion 24 upon said latter arbor meshes with a gear 25 upon the arbor 26. Upon the outer ends of each of said arbors are affixed pointers 27 adapted to traverse the dial faces 28 in the usual and well known manner. As is usual in devices of this character, the ratio of the number of teeth formed on the pinion to the number of teeth formed on its inter-meshing gear is preferably 1 to 10, so that one complete revolution of any one of the arbors will cause the arbor at its left to register one-tenth of a revolution.

As shown in Fig. 2, each division of the dial at the extreme right indicates a consumption of electricity amounting to five cents. The next succeeding dial to the left is marked to indicate dollars, the next to indicate tens of dollars and the one on the extreme left to indicate hundreds of dollars, the registering device shown in Fig. 2, for example, having its pointers so positioned as to read one hundred and twenty-seven dollars and thirty cents. The dial plate is spaced from the front plate by suitable sleeves 29 in the usual manner, and this front plate is secured to the supports 30 of the base in any suitable manner as by the screws 31 and if necessary washers 32 may be inserted between said front plate and said supports for the purpose hereinafter described.

Referring now to the manner of mounting the arbor 5, to which the gear 4 and pinion 8 are secured, it will be seen from Fig. 3 that said arbor is maintained in position by the adjustable bearings 33 and 34 which extend through openings 35 formed in the upper and lower plates 6 and 7 and are provided with pointed ends which engage corresponding recesses in the ends of the arbor. These bearings are preferably threaded and are retained in position by means of the nuts 36 and 37 engaging therewith.

It will be understood from the above description that the bearings 33 and 34 may be moved outwardly to permit the removal of the arbor 5 which may then be replaced by a similar arbor having secured thereto a pinion similar in all respects to the pinion 8 and a gear corresponding to the gear 4, but provided with more or less teeth than said gear for the purpose hereinafter described, said arbor being retained in position by moving the bearings inwardly to engage the corresponding recesses.

In order to compensate for the difference in diameters of the gear which has been removed and the gear which has been inserted in its place, and to cause the inserted gear to mesh with the pinion 3, the face plate 16 to which the plates 6 and 7 are secured is spaced from the frame the required distance by means of the washers 32. If the inserted gear is of greater diameter than the one it has replaced, it will, of course, be necessary to employ more washers, or thicker ones, to so adjust the parts that said gear will mesh properly with the pinion 3, while, on the other hand, if the inserted gear is of less diameter than the one it has replaced, it will be necessary to employ either a less number of washers, or thinner ones. It will thus be seen that by using washers of different thicknesses the face plate may be so spaced with respect to the frame that gears of different diameters may be substituted for the gear 4, which gears may be caused to mesh with the pinion 3. By way of illustration, the radius of the inserted gear 38, shown in dotted lines in Fig. 1, is less than the radius of the gear shown in solid lines by an amount substantially equal to the width of the washers, in which case, in order that said gear may mesh with the pinion 3, as indicated in dotted lines, no washers would be used between the front plate and its support, but it will, of course, be understood that if said inserted gear were of greater diameter than shown in dotted lines fewer washers or washers of less width would be inserted for the ones shown.

The operation of the device will be obvious from the above description. Assuming, for example, that the price per unit of electricity is ten cents, the gear 4 will be so proportioned that the rotation of the driven member corresponding to said unit amount will cause the dial at the extreme left to indicate ten, thus showing to the consumer that ten cents worth or one unit of current has been consumed. If, now, the meter is to be used in a place where, for example, the charge per unit is twenty cents, arbor 5 carrying the gear 4 will be removed and a similar arbor carrying a gear having one-half the number of teeth would be inserted in its place, the front plate being adjusted with respect to its supports in the manner above described to cause said inserted gear to mesh with the pinion as indicated in dotted lines in Fig. 1. As said inserted gear has only one-half the number of teeth of the gear which it has replaced, and as the pinion secured to the inserted arbor has the same number of teeth as the pinion carried by the replaced arbor, it follows that when the driven member has rotated the same number of times as in the first case to indicate a unit quantity of electricity, the pointer at the extreme right will have passed through double the distance it passed through in the first case and will coincide with the division of the dial marked twenty, thus indicating to the consumer that twenty cents worth, or one unit of electricity, has been consumed. If the charge per unit should be less than ten cents the inserted gear, of course, will be provided with more teeth, instead of less, thus causing less relative movement between the pointer and the driven member. It will thus be seen that by providing a gear with a number of teeth proportional to the amount charged per unit and inserting it in position between the gear 9 and the driven pinion 3 the pointers of the dial will register the exact cost in dollars and cents of the current which has been consumed.

As many changes could be made in the above construction and many apparently widely different embodiments of this invention could be made without departing from the scope thereof, it is intended that all matter contained in the above description or shown in the accompanying drawings shall be interpreted as illustrative and not in a limiting sense. It is also to be understood that the language used in the following claims is intended to cover all of the generic and specific features of the invention herein described, and all statements of the scope of the invention which, as a matter of language, might be said to fall therebetween.

Having described my invention, what I claim as new and desire to secure by Letters Patent is:

1. In a meter, in combination, a driven member, registering means bodily movable with respect thereto, an intermediate mechanism for transmitting motion from said driven member to said registering means, said mechanism comprising a member adapted to be removed and to be replaced by a member of different size, and means for varying the position of said registering means with respect to said driven member.

2. In a meter, in combination, a driven member, registering means bodily movable with respect thereto, a train of intermeshing gears intermediate said member and said means, means adapted to permit one of said gears to be removed and a gear of different diameter inserted in its place, and means for varying the position of said registering means with respect to said driven member.

3. In a meter, in combination, a driven member, registering means bodily movable with respect thereto, a support therefor, a plurality of gears intermediate said driven member and said means, means adapted to permit one of said gears to be removed and a gear of different diameter inserted in its place, and adjustable means adapted to coact with said registering means and said support to vary the position of the former with respect to the latter whereby to compensate for the difference in diameter of said inserted gear with respect to the replaced gear.

4. In a meter, in combination, a driven member, registering means bodily movable with respect thereto, a plurality of intermeshing gears intermediate said driven member and said registering means and adapted to be moved toward or away from said member, bearings operatively associated with one of said gears, one of said bearings being movable to permit said gear to be removed and a gear of different diameter inserted in its place, and means for varying the position of said registering means and said plurality of gears with respect to said driven member.

5. In a meter, in combination, a driven member, registering means bodily movable with respect thereto, a plurality of intermeshing gears intermediate said driven member and said registering means and adapted to be moved toward or away from said member, bearings operatively associated with one of said gears, said bearings being movable to permit said gear to be removed and a gear of different diameter inserted in its place, and means for varying the position of said registering means and said plurality of gears with respect to said driven member.

6. In a meter, in combination, a driven member, registering means bodily movable with respect thereto, a plurality of intermeshing gears intermediate said member and said means and adapted to be moved toward or away from said member, one of said gears being provided with an arbor having a recess in one of its ends, a bearing engaging said recess, said bearing being movable to permit said gear to be removed and a gear of different diameter and provided with a similar arbor to be inserted in its place, and means for varying the position of said registering means and said plurality of gears with respect to said driven member.

7. In a meter, in combination, a driven member, registering means bodily movable with respect thereto, a plurality of intermeshing gears intermediate said member and said means and adapted to be moved toward or away from said member, one of said gears being provided with an arbor having recesses in its ends, bearings engaging said recesses, said bearings being movable to permit said gear to be removed and a gear of different diameter and provided with a similar arbor to be inserted in its place, and means for varying the position of said registering means and said plurality of gears with respect to said driven member.

8. In a meter, in combination, a driven member, registering means bodily movable with respect thereto, a support therefor, a plurality of gears intermediate said driven member and said means, means adapted to permit one of said gears to be removed and a gear of different diameter inserted in its place, and adjustable spacing members adapted to be placed between said support and said registering means to vary the position of the former with respect to the latter, whereby to compensate for the difference in diameter of said inserted gear with respect to the replaced gear.

9. In a meter, in combination, a driven member, registering means, a plate upon which said means are mounted, a support for said plate, a plurality of gears intermediate said driven member and said registering means, means adapted to permit one of said gears to be removed and a gear of different diameter inserted in its place, and adjustable spacing members adapted to be interposed between said plate and said support to vary the position of the former with respect to the latter, whereby to compensate for the difference in diameter of said inserted gear with respect to the replaced gear.

10. In a meter, in combination, a driven member, registering means bodily movable with respect thereto, intermediate mechanism for transmitting motion from said driven member to said registering means, said mechanism being bodily movable with respect to said driven member, said mechanism comprising a member adapted to be removed and to be replaced by a member of different size, and means for varying the position of said registering means and said mechanism with respect to said driven member.

11. In a meter, in combination, a base, a driven member supported thereby, registering means mounted upon said base, an intermediate mechanism for transmitting motion from said driven member to said registering means, said mechanism comprising a member adapted to be removed and to be replaced by a member of a different size, and means for varying the position of said registering means with respect to said base, whereby to compensate for the difference in diameter of said inserted gear with respect to the replaced gear.

In testimony whereof I affix my signature, in the presence of two witnesses.

ROBERT LEE RICKMAN.

Witnesses:

A. E. Galpin,

H. H. Philips.